United States Patent [19]
Bleiker et al.

[11] Patent Number: 5,625,179
[45] Date of Patent: Apr. 29, 1997

[54] ISOLATOR FOR A METAL-ENCAPSULATED, GAS-INSULATED, HIGH-VOLTAGE SWITCHING INSTALLATION

[75] Inventors: Daniel Bleiker, Zürich; Sven Forss, Steffisburg; Herbert Schifko, Glattbrugg, all of Switzerland

[73] Assignee: Asea Brown Boveri AG, Baden, Switzerland

[21] Appl. No.: 411,563

[22] Filed: Mar. 28, 1995

[30] Foreign Application Priority Data

Apr. 19, 1994 [CH] Switzerland ............... 1216/94

[51] Int. Cl.$^6$ ........................... H01H 33/53
[52] U.S. Cl. .................. 218/80; 218/67; 218/45
[58] Field of Search ............... 218/1–6, 8–12, 218/16, 43–45, 48, 55, 67, 68, 79, 80, 100, 152

[56] References Cited

U.S. PATENT DOCUMENTS

| 3,806,682 | 4/1974 | Mauthe et al. | 200/148 B |
| 4,109,124 | 8/1978 | Boersma et al. | 200/148 B |
| 5,484,972 | 1/1996 | Tecchio | 218/70 |

FOREIGN PATENT DOCUMENTS

| 2346884 | 10/1977 | France | H02B 13/02 |
| 2629283 | 9/1989 | France | H02B 1/18 |
| 4210545A1 | 10/1993 | Germany | H01H 33/24 |

*Primary Examiner*—Michael L. Gellner
*Assistant Examiner*—Michael A. Friedhofer
*Attorney, Agent, or Firm*—Burns, Doane, Swecker & Mathis, L.L.P.

[57] ABSTRACT

An isolator for a metal-encapsulated, gas-insulated high-voltage switching installation includes two contact supports and an enclosure. The enclosure has a longitudinal axis and is filled with insulating gas. The two contact supports are arranged in the enclosure. Each of the contact supports has a surface. A surface of a first one of the contact supports and a surface of the second one of the contact supports oppose each other to form opposing surfaces and define a separation that forms an isolating gap between the opposing surfaces. The isolator further includes a contact arrangement. The contact arrangement is movable along an operating axis between a connected state and a disconnected state. The contact arrangement electrically conductively shorts the separation when the contact arrangement is in the connected state. The longitudinal axis and the operating axis form a first angle with one another, and the opposing surfaces extend parallel to one another in a region of the isolating gap and are bent through a second angle with respect to the longitudinal axis.

11 Claims, 3 Drawing Sheets

ISOLATOR FOR A METAL-ENCAPSULATED, GAS-INSULATED, HIGH-VOLTAGE SWITCHING INSTALLATION

BACKGROUND OF THE INVENTION

1. Field of the Invention

The invention is based on an isolator for a metal-encapsulated, gas-insulated, high-voltage switching installation.

2. Discussion of Background

In this case, the invention makes reference to a prior art as a result, for example, from the Laid-Open Specification DE-A1-42 10 545. This publication describes an isolator for a metal-encapsulated, gas-insulated, high-voltage switching insulation, having two switching pieces which are arranged in the metal encapsulation, which is filled with insulating gas, and can make contact with one another, or can be isolated from one another, along an axis, each having a pre-arcing contact, which is in the form of a pin, extends axially and is constructed as an overtravel contact in the case of one of the two switching pieces, and having a stationary contact which coaxially surrounds the pre-arcing contact of a stationary one of the two switching pieces, as well as having a moving contact which is provided on a moving one of the two switching pieces and, in the connected position, forms a continuous current path with the stationary contact.

This isolator has a comparatively large axial extent. This is a result of the fact that both the actual isolating gap of the isolator and all the moving parts lie on one axis, which coincides with the longitudinal axis of the current-carrying active parts of the gas-insulated switching installation. In addition, as a result of the overtravel contact, structural elements were introduced into the moving switching piece, which have a considerable extent in the axial direction and must be shielded in high-voltage terms. This leads to a not inconsiderable enlargement in the axial direction of the isolating switch geometry, which is already intended to form a significant part as a result of the isolation distance of the open isolating gap.

SUMMARY OF THE INVENTION

Accordingly, one object of the invention is to provide a novel isolator for a metal-encapsulated, gas-insulated, high-voltage switching installation of the type mentioned initially, whose dimensions are comparatively small in the axial direction.

The isolator is provided for a metal-encapsulated, gas-insulated, high-voltage switching installation. It has two contact supports which are arranged in an enclosure which has a longitudinal axis and is filled with insulating gas, having a separation, which is designed as an isolating gap, between mutually opposite surfaces of the two contact supports. The isolator is provided with a contact arrangement which moves along an operating axis and electrically conductively shorts the separation when the isolator is in the connected state. An isolator arrangement which is particularly space-saving in the axial direction is achieved in that the longitudinal axis of the enclosure and the operating axis of the isolator form a first angle with one another, and the surfaces of the two contact supports run parallel to one another in the region of the isolating gap and are bent through a second angle with respect to the longitudinal axis.

Particularly favorable isolator designs result if the the angular sum of the first angle and of the second angle is 90°.

In this case, the second angle can be in a range from 25° to 35° but preferably 30°.

The surfaces of the two contact supports have a third angle with respect to the operating axis of the isolator in the region of the isolating gap. If the third angle is constructed as a right angle, then an expedient embodiment of the isolator results.

A particularly short assembly results if at least one installation option for a grounding switch, which has an installation axis, is in each case provided in the enclosure, on both sides of the isolating gap.

In addition, it has been found to be particularly advantageous if the shield of the moving contact arrangement now no longer enlarges the axial structural length of the isolator.

The open isolating gap of the isolator is insulated in a very highly reliable manner by means of $SF_6$. In the closed state, the isolator has an optimum rated current carrying capacity, a very good short-circuit current carrying capacity and surge-current resistance. Furthermore, it has a reliable switching capability for small capacitive currents while additionally coping with the changeover in the event of an interruption free busbar change.

The isolator has separate contact systems for carrying continuous current for the actual switching process. The continuous-current contacts are designed to be simple and reliable, and they have a minimum number of individual parts. The contact movement is carried out by means of an electrically operated isolator drive which is arranged outside the isolator enclosure, which is filled with $SF_6$ gas, but the isolator can also be driven by hand. Such a configuration simplifies maintenance tasks in a highly advantageous manner. The isolator is provided with a mechanically coupled position indication and, furthermore, a sight glass can be provided for an endoscope for inspection of the position of the contacts.

Further exemplary embodiments of the invention and the advantages which can be achieved thereby are explained in more detail in the following text, with reference to the drawing, which illustrates only one possible embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Elements which act in the same manner are provided with the same reference designations in all the Figures. Only those elements which are required for immediate understanding of the invention are illustrated.

DESCRIPTION OF THE PREFERRED EMBODIMENTS

Figure 1:
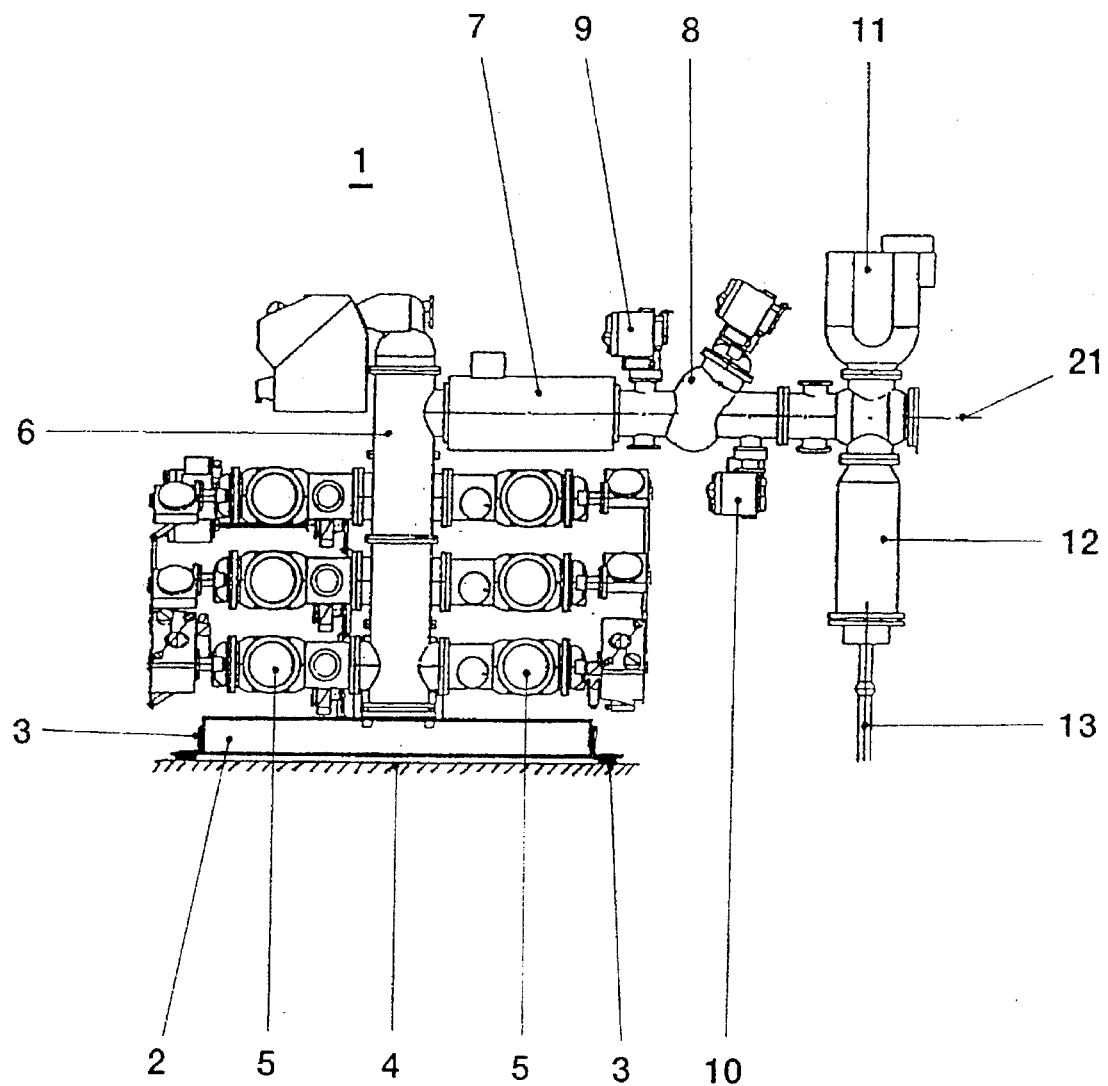
FIG. 1 shows a side view of an outlet panel of a gas-insulated switching installation having a built-in isolator according to the invention.

Referring now to the drawings, wherein like reference numerals designate identical or corresponding parts throughout the several views, FIG. 1 shows a schematically illustrated side view of an outlet panel 1 of a metal-encapsulated, gas-insulated switching installation. This outlet panel 1 has a supporting frame 2, which is manufactured from a metal section. Fitted to the corners of the supporting frame 2 are angled sections 3, which are used to connect the supporting frame 2 to a foundation 4. This connection can be constructed in a force-fitting manner, but it can also allow the supporting frame 2 to slide on a supporting rail which is incorporated in the foundation 4 and is not illustrated here. In the case of this type of metal-encapsulated, gas-insulated switching installation, the busbars 5 are arranged vertically one above the other on one or both sides of the vertically positioned circuit breakers 6. The outlet is provided with a current transformer 7, downstream of which an isolator 8 is connected. A grounding switch 9, 10 is in each case installed in the enclosure of the isolator 8 here, on both sides of the isolator 8. A voltage converter 11 is provided downstream of the isolator 8. A cable connection 12 connects the outgoing high-voltage cable 13 to the gas-insulated switching installation. The busbars 5 each have one longitudinal axis. The longitudinal axes of each of the two busbar systems lie in a plane, vertically one above the other.

Figure 2:
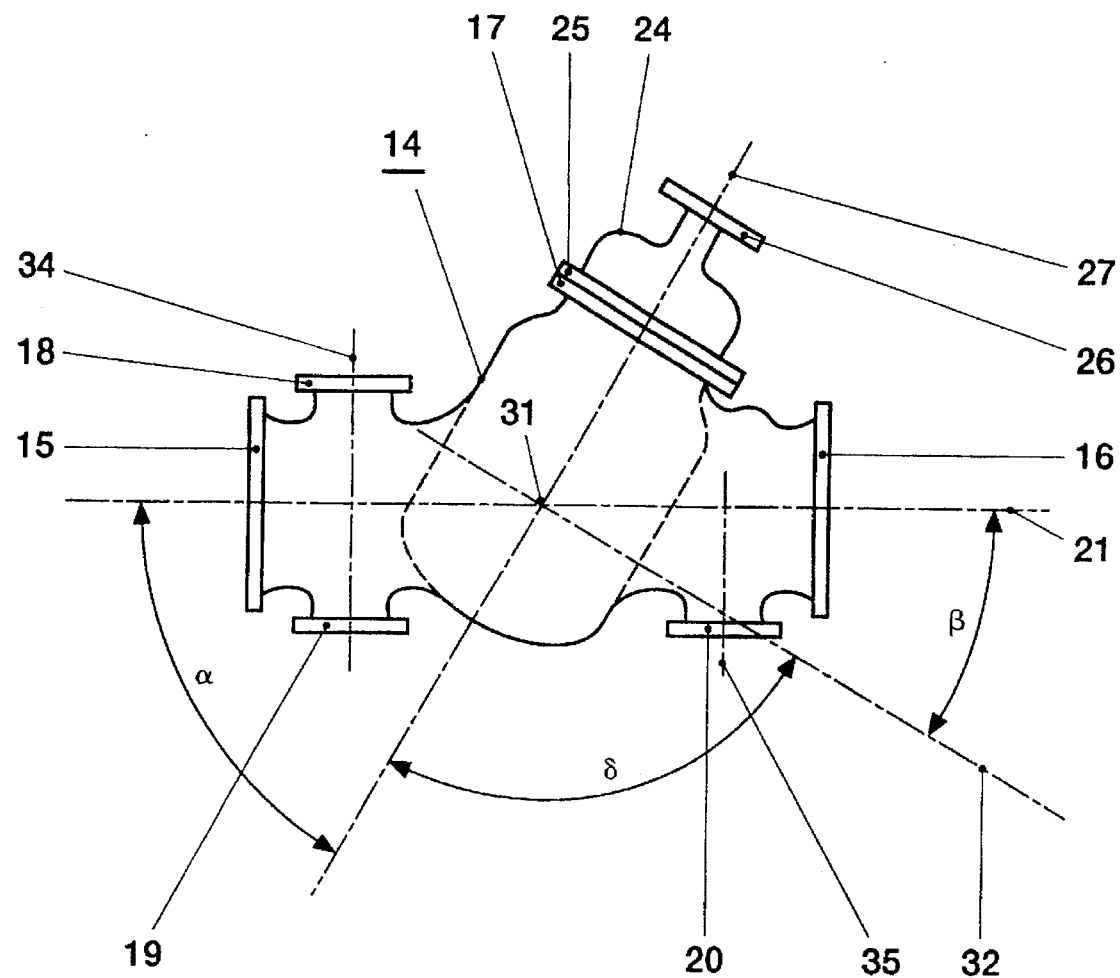
FIG. 2 shows a view of an enclosure of an isolator according to the invention.

The enclosure 14, which is illustrated separately and in simplified form in FIG. 2, of the isolator 8 has a wall made of metal. As a rule, the enclosure 14 is cast in a pressure tight manner from an aluminum alloy. The enclosure 14 has six openings which are provided with flanges 15 to 20. In addition, the enclosure 14 has a longitudinal axis 21, which at the same time represents the center axis of the active parts, which open in the enclosure 14, of the gas-insulated switching installation. The openings, which are provided with the flanges 15 and 16, are closed in a gas-tight manner by in each case one compartment insulator 22, 23 during assembly of the isolator, as is illustrated schematically in FIG. 3. The opening which is provided with the flange 17 is provided with a metallic cover 24 during assembly of the isolator, which cover 24 has a flange 25 which is screwed to the flange 17 in a gas-tight manner. A further flange 26 is fitted on the cover 24, opposite the flange 25. The flange 26 is used for fastening a pressure-tight bushing for an insulating material rod 28, which can move in the direction of an operating axis 27 during a switching process of the isolator 8. Driven by an isolator drive 29 which is likewise connected to the flange 26, the insulating material rod 28 moves the moving contact arrangement 30, which is illustrated in highly schematic form, of the isolator 8. The moving contact arrangement 30 is surrounded by a dielectrically acting shield 30a, through which the insulating material rod 28 passes. The longitudinal axis 21 and the operating axis 27 lie in a plane and intersect at an angle $\alpha$. The angle $\alpha$ is designed to be 60° here. A further axis 32 passes through the intersection 31 of the longitudinal axis 21 and the operating axis 27 and forms an angle $\delta$ with the operating axis 27, which angle $\delta$ is constructed as a right angle here. The axis 32 forms an angle $\beta$ with the longitudinal axis 21. The angle $\beta$ is designed to be 30° here. Other angles $\beta$ are also possible if the other angles are correspondingly modified, it being possible sensibly to implement an angle range of 25° to 35° for this angle $\beta$. It is advantageous with respect to the arrangement of the isolator 8 if the angular sum of the angle $\alpha$ and the angle $\delta$ is 90°.

Figure 3:
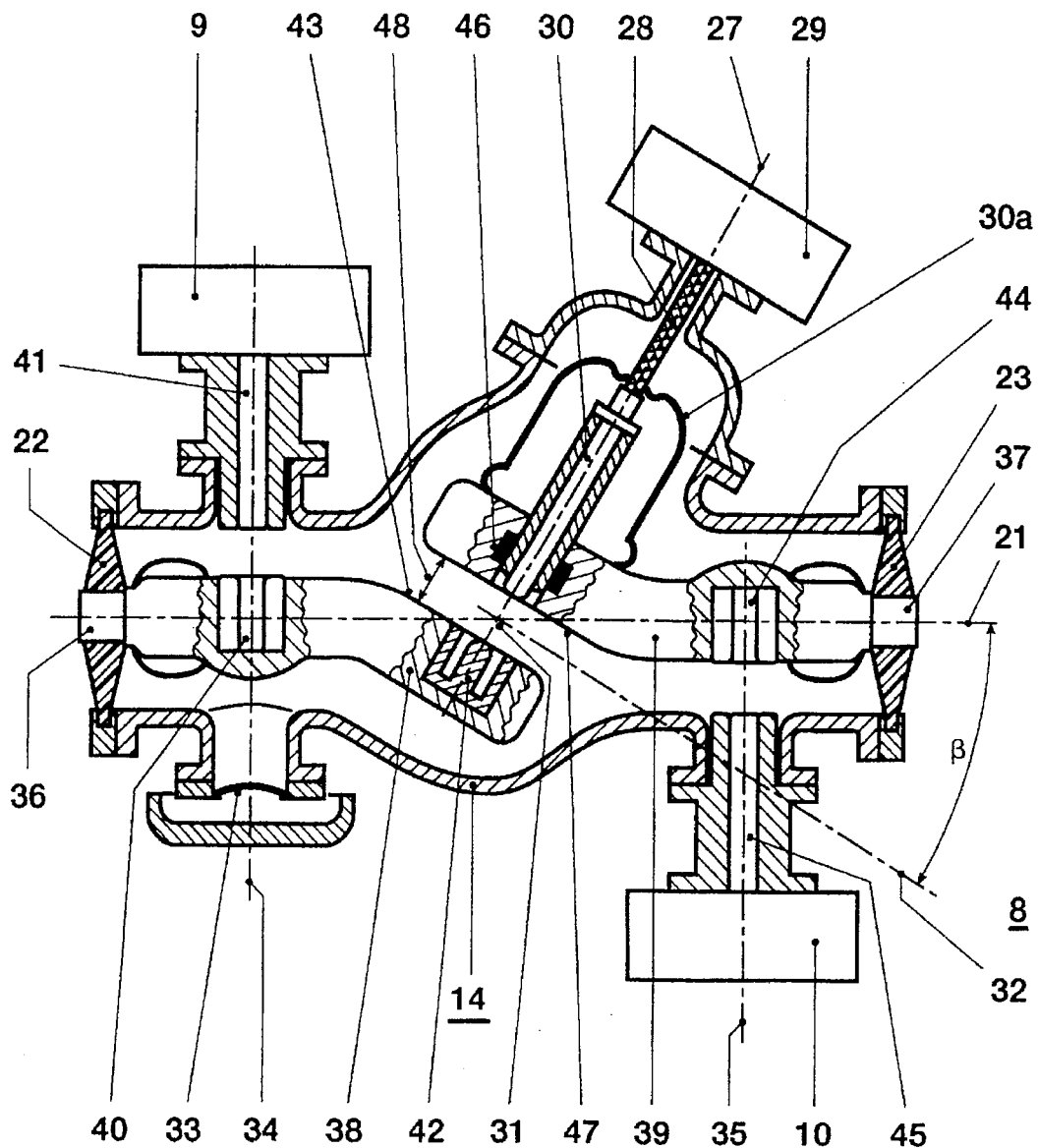
FIG. 3 shows a highly simplified section through an isolator according to the invention.'

The openings which are provided with the flanges 18 and 19 are provided for the optional installation of a grounding switch 9, it being possible in this case for the grounding switch 9 either to be installed above the enclosure 14, as shown in FIG. 1 or else below it, if the concept of the gas-insulated switching installation should require this. Detectors for monitoring the gas-insulated switching installation, for example, or, as is shown in FIG. 3, a bursting disk 33, which makes pressure relief of the enclosure 14 possible in the event of a defect, can be flange connected in a pressure-tight manner to the remaining one of the two flanges 18, 19. The two flanges 18, 19 have a common installation axis 34. The flange 20 is likewise provided for the pressure-tight installation of a grounding switch 10, which extends along an installation axis 35. The two installation axes 34, 35 lie in a plane here with the operating axis 27, which results in a particularly space-saving arrangement. The said axes may also lie in different planes for special applications.

The section through an isolator according to the invention, according to FIG. 3, shows the active parts of the isolator 8 in highly simplified form. One of two electrical connections 36, 37, which may be brought to high-voltage potential and are shielded in potential terms from the metal encapsulation of the gas-insulated switching installation, is in each case passed through the compartment insulators 22, 23. The electrical connection 36 is electrically conductively connected to a first stationary contact support 38 of the isolator 8. The electrical connection 37 is electrically conductively connected to a second stationary contact support 39 of the isolator 8. The contact supports 38, 39 are assembled from a plurality of components, which are not illustrated here.

The contact supports 38, 39 are formed in a dielectrically favorable manner, any edges being provided with shields. A mating contact 40, which is constructed in the form of a tulip, is arranged concentrically with respect to the installation axis 34 and accommodates the contact pin 41 of the grounding switch 9 when the grounding switch 9 is closed, is incorporated in the contact support 38. Furthermore, the stationary contact 42 of the isolator 8, which is arranged concentrically with respect to the operating axis 27, is incorporated in the contact support 38. The contact support 38 is initially arranged concentrically with respect to the longitudinal axis 21 after the electrical connection 36, that part of the contact support 38 which is adjacent thereto being bent such that it extends, as shown in FIG. 3, somewhat below the longitudinal axis 21. A surface 43 of this bent part extends at right angles to the operating axis 27. A mating contact 44, which is constructed in the form of a tulip, is arranged concentrically with respect to the installation axis 35 and holds the contact pin 45 of the grounding switch 10 when the grounding switch 10 is closed, is incorporated in the contact support 39. Furthermore, a sliding contact 46, which is provided to transfer current from the moving contact arrangement 30 of the isolator 8 to the contact support 39, is incorporated in the contact support 39. The sliding contact 46 is arranged concentrically with respect to the operating axis 27 and is provided with contact fingers, contact laminates or spiral contacts. The contact support 39 is initially arranged concentrically with respect to the longitudinal axis 21 after the electrical connection 37, that part of the contact support 39 which is adjacent thereto being bent such that, as shown in FIG. 3, it extends somewhat above the longitudinal axis 21. A surface 47 of this bent part extends at right angles to the operating axis 27 of the isolator 8. The two surfaces 43 and 44 run parallel to one another, at a separation 48, and they are inclined at the angle $\beta$ with respect to the longitudinal axis 21. The surfaces 43 and 44 merge into heavily chamfered regions, with an increasing separation from the operating axis 27. This separation 48 corresponds to the isolating gap of the isolator 8 which gap, in operation, withstands all the voltage stresses occurring at this point as a result of operation.

During connection of the isolator 8, the moving contact arrangement 30 is moved along the operating axis 27 onto the stationary contact 42 by the insulating material rod 28, which is operated by the isolator drive 29. Any pre-arcing, which may be caused by residual charges and/or by an operating frequency voltage applied between the contact supports 38, 39, between the moving contact arrangement 30 and the stationary contact 42 is coped with correctly by the isolator 8. It is not possible for any expansion of the pre-arcing arc towards the wall of the enclosure 14 to occur, because of the geometrical arrangement of the contact supports 38, 39. The isolator drive 29 is designed such that it reliably moves the moving contact arrangement 30 into the intended connecting position in every possible operational case, thus ensuring that current is passed directly via the rated current contacts which are provided for this purpose and are not described in more detail. Likewise, the opening of the isolator 8 also always takes place correctly.

The isolator 8 can be installed in any desired installation position which is specified by the installation concept of the metal-encapsulated, gas-insulated switching installation. The grounding switches 9, 10 can likewise be operated independently of position, so that they do not result in any installation limitations either. The grounding switches 9, 10 can be constructed both as work in progress grounding switches and as quick-reaction grounding switches. The assembly formed by the isolator 8 with the grounding switches 9, 10 connected upstream and downstream of it is of highly compact design and occupies particularly little space in the axial direction, so that the switch panel can be designed with particularly small dimensions.

Bends in the current path of the gas-insulated switching installation result in high electrodynamic forces occurring in the current path at these points in the event of high false currents occurring, particularly in the event of short-circuit surge currents. The bent contact supports 38, 39 provided in the isolator 8 cause such a bend in the current path. Thanks to the electrodynamically favorable construction of the contact supports 38, 39, in conjunction with the rated current contact, which is arranged at right angles to them when the isolator 8 is closed, of the moving contact arrangement 30, the deviation of the effective current path from the ideal course along the longitudinal axis 21 can be kept comparatively small. This small deviation results in it being possible to keep the bending moments acting on the contact supports 38, 39 in the event of an electrodynamic load comparatively small, so that the compartment insulators 22, 23 which support the contact supports 38, 39 can absorb these moments without additional reinforcement.

In the case of a further isolator design, it is also conceivable to allow the angle β to tend to zero, but the contact supports 38, 39 would then have to be constructed in a correspondingly bent manner. If the angle β assumes the value zero, the operating axis 27 of the isolator 8 is positioned vertically on the longitudinal axis 21 of the enclosure 14, and the surfaces 43 and 47 run parallel to the longitudinal axis 21. Although such a configuration of the contact supports 38, 39 results in a somewhat larger enclosure diameter, it can, however, prove to be sensible for special applications.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An isolator for a metal-encapsulated, gas-insulated high-voltage switching installation comprising:

two contact supports;

an enclosure, the enclosure having a longitudinal axis and being filled with insulating gas;

the two contact supports being arranged in the enclosure, each of the contact supports having a surface, a surface of a first one of the contact supports and a surface of the second one of the contact supports opposing each other to form opposing surfaces and defining a separation that forms an isolating gap between the opposing surfaces;

a contact arrangement, the contact arrangement being movable along an operating axis between a connected state and a disconnected state, the contact arrangement electrically conductively shorting the separation when the contact arrangement is in the connected state, wherein the longitudinal axis and the operating axis form a first angle with one another, and the opposing surfaces extend parallel to one another in a region of the isolating gap and are bent through a second angle with respect to the longitudinal axis.

2. The isolator as claimed in claim 1, wherein an angular sum of the first angle and of the second angle is 90°.

3. The isolator as claimed in claim 2, wherein the second angle is in a range from 25° to 35°.

4. The isolator as claimed in claim 3, wherein the second angle is 30°.

5. The isolator as claimed in claim 1, wherein the opposing surfaces form a third angle, in the region of the isolating gap, to the operating axis.

6. The isolator as claimed in claim 5, wherein the third angle is a right angle.

7. The isolator as claimed in claim 1, wherein the enclosure includes at least one grounding switch installation site on opposite sides of a location of the isolating gap relative to the enclosure, the each grounding switch installation site having an installation axis.

8. The isolator as claimed in claim 7, wherein each installation axis forms a right angle to the longitudinal axis.

9. The isolator as claimed in claim 8, wherein each installation axis lies in a common plane with the operating axis.

10. The isolator as claimed in claim 1, wherein the longitudinal axis and the operating axis lie in a common plane.

11. The isolator as claimed in claim 1, further comprising a first electrical connection electrically conductively connected to the first one of the contact supports and a second electrical connection electrically conductively connected to the second one of the contact supports, the first electrical connection and the second electrical connection lying on the longitudinal axis.

* * * * *